United States Patent

Grundy et al.

[15] 3,706,856

[45] Dec. 19, 1972

[54] MEANS FOR SUPERVISION OF THE CONTROL OF TELECOMMUNICATIONS SWITCHING NETWORKS

[72] Inventors: Brian Grundy, Ashton-In-Makerfield; Peter Samuel Hampson, Leigh, both of England

[73] Assignee: Plessey Handel und Investments A.G., Zug, Switzerland

[22] Filed: March 31, 1971

[21] Appl. No.: 129,903

[30] Foreign Application Priority Data

April 8, 1970 Great Britain....................16,629/70

[52] U.S. Cl.............................................179/18 GE
[51] Int. Cl...............................................H04q 3/52
[58] Field of Search.................................179/18 GE

[56] References Cited

UNITED STATES PATENTS 3,480,913 11/1969 Sherstiuk ........................179/18 GE
3,462,653 8/1969 Koeman ..........................179/18 GE

*Primary Examiner*—Thomas W. Brown
*Attorney*—Scrivener, Parker, Scrivener and Clarke

[57] ABSTRACT

A switching network formed by a succession of link-connected stages of crosspoint matrix switches A, B, C and D and having marking means, for marking salient points of any connection required to be established over the network, in which the control equipment includes or has associated with it a separate detecting means for each stage of the network and each of these detecting means is connected to all marking conductors from which marking diodes of all inlets of matrix switches of the particular stage are branched and in which the marking means appropriate to a required inlet of a matrix switch of that stage is only rendered operative as a result of said detecting means responding to a valid signal emanating over particular ones of the marking diodes and resulting solely from the application of a significant source of potential to the marking/holding conductor of the matrix switch outlet to which said inlet is required to be connected.

3 Claims, 1 Drawing Figure

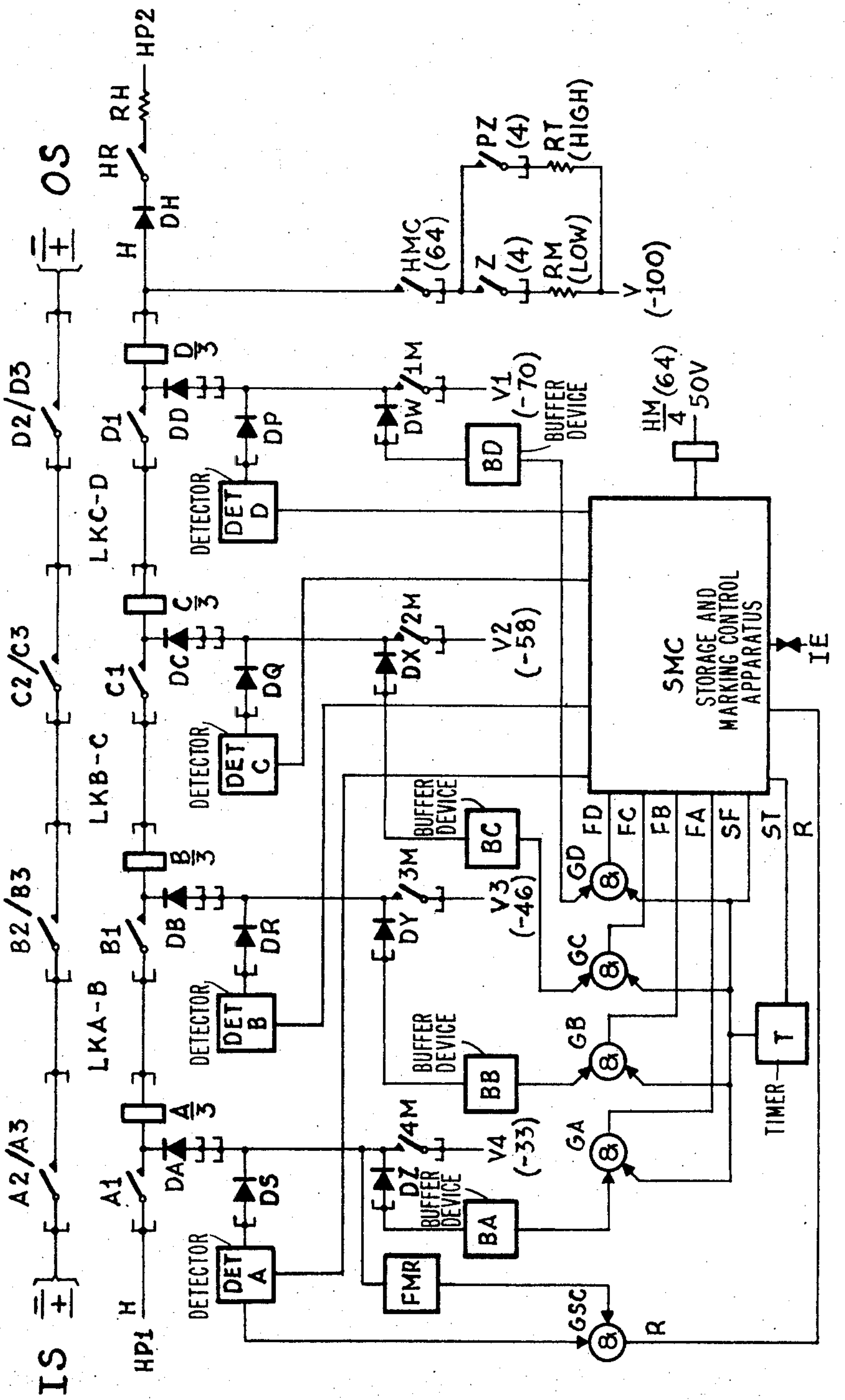
IS
OS
HP1
HP2
H
HR
RH
DH
A2/A3
B2/B3
C2/C3
D2/D3
A1
B1
C1
D1
LKA-B
LKB-C
LKC-D
DA
DB
DC
DD
DS
DR
DQ
DP
DZ
DY
DX
DW
4M
3M
2M
1M
V4 (-33)
V3 (-46)
V2 (-58)
V1 (-70)
HMC (64)
Z (4)
PZ (4)
RM (LOW)
RT (HIGH)
V (-100)
DETECTOR
DET A
DET B
DET C
DET D
BUFFER DEVICE
BA
BB
BC
BD
FMR
GSC
GA
GB
GC
GD
R
FD
FC
FB
FA
SF
ST
TIMER
T
SMC
STORAGE AND MARKING CONTROL APPARATUS
IE
HM/4 (64)
50V

MEANS FOR SUPERVISION OF THE CONTROL OF TELECOMMUNICATIONS SWITCHING NETWORKS

The present invention relates to supervision of the control of telecommunications switching networks of the kind formed by a succession of link-connected ranks or stages of matrix switches wherein each of the switches comprises electromagnetic cross-point relays, and the establishment of connections over the network is controlled by marking means.

A matrix switch, formed by columns and rows of crosspoint relays and having a plurality of inlets and a plurality of outlets, enables any inlet to be connected to any outlet by the operation of the appropriate cross-point relay. Preferably, but not essentially the cross-point relays are each of the co-called reed-type having a plurality of individually encapsulated contact units adapted for actuation by a magnetic field which is impressed upon them when an associated electrical winding is energized.

In a known matrix switch involving single-winding cross-point relays each with a plurality of "make" contact units, the switch is controlled by first marking conductors individual to each (say) column of the matrix and by second marking conductors individual to each (say) row of the matrix; each first marking conductor extending to one side of the winding of each relay of the pertinent column over rectifier diodes individual to the relays; and each second marking conductor, which is also to serve as a holding conductor appropriate to a particular row, extending to the complementary side of the winding of each relay of the pertinent row. In this known arrangement, which has a beforementioned rectifier diode (conveniently known as a marking diode) individual to each crosspoint relay, for isolating purposes, each crosspoint relay is provided with a "-make" contact unit which is additional to those concerned with the direct switching-through of an inlet-to-outlet connection over the matrix switch. This contact unit has one side connected to the junction of its own relay coil and the associated diode, and its other side connected in common with identical contact units of relays of the same column to a holding conductor appropriate to the particular column.

With this arrangement, and arbitrarily assuming that the switch inlets and outlets are related to individual columns and rows respectively, the co-ordinate marking of one column marking conductor and one row marking/holding conductor results in the exclusive operation of the particularly defined cross-point relay in series with its marking diode. Accordingly a through-connection is set-up between the relevant inlet and outlet. Furthermore the additional contact unit of the relay completes a holding path for the relay, between the pertinent column holding conductor and the pertinent row marking/holding conductor, since it is arranged that suitable potentials are evident at these conductors when the marking potentials are removed. A switch of this kind enables a plurality of separate connections through it to be in the established state concurrently, e.g. a switch with eight inlets and eight outlets caters for eight concurrent connections, although each requires to be set-up individually.

A matrix switch of the kind outlined will be conveniently referred to hereinafter as a matrix switch employing marking diodes between its inlet marking leads and the crosspoint relay coils.

In the case of a switching network comprising a plurality of link-connected ranks or stages of matrix switches using relay/diode crosspoints as hereinbefore mentioned, the marking means which is employed for setting-up of connections through the network on a one-at-a-time basis is arranged, in accordance with received instructional signals, to present markings to salient points of the network whereby the whole of the connection which is required to be set-up is uniquely defined. The particular form of network contemplated has all the matrix switches of all its ranks or stages identically oriented from the electrical point of view, so that following the earlier assumption that the matrix columns and rows appertain to switch inlets and outlets respectively, and that arbitrarily the inlets of the first stage switches are the inlets of the network whereas the outlets of the last stage switches are the outlets of the network, then the before-mentioned hold contact unit of every crosspoint extends to or towards the inlets side of the network.

With a network arrangement of this kind, the number of markings involved in the setting-up of a connection is one more than the number of ranks or stages involved in the network. Thus in the case of a four stage network (stages A, B, C and D) a connection which is required to be set-up through all stages is defined by a unique combination of five markings:

1. to define the particular network outlet being the outlet (row) of one D-stage switch,
2. to define the required inlet (column) of the aforesaid D switch; the particular inlet being pertinent to a C-D link and therefore being uniquely related to an outlet of a certain C-stage switch,
3. to define the required inlet of the just-mentioned C-stage switch and, in consequence of the related B-C link, a particular outlet of a certain B-stage switch,
4. to define the required inlet of the just-mentioned B-stage switch and, because of the related A-B link, a particular outlet of that A-stage switch serving a group of network inlets including that one concerned in the required connection,
5. to define the particular network inlet, being an inlet (column) of the just-mentioned A-stage switch.

When the five markings appropriate to the required connection through the network are applied, markings (1) and (2) effect operation of the uniquely defined D-stage matrix relay, so that one step of the through-connection is completed. The beforementioned additional contact unit of the D crosspoint relay advances a marking condition over the hold wire of the C-D link to the marking conductor of the relevant outlet of that C-switch which is already in receipt of marking (3) above defining its required inlet.

The co-ordinate marking of the particular C-switch in this manner results in the operation of the uniquely defined crosspoint relay of that switch, so that a second step in the establishment of the through-connection is completed, whereas the additional contact unit of the operated C-switch crosspoint relay passes a marking condition over the hold-wire of the nominated B-C link to the marking conductor of the relevant outlet of that B-switch which is already in receipt of marking (4) above, defining its required inlet. The resulting operation of the pertinent B-switch crosspoint completes the third step of the through-connection and passes a marking condition to the appropriate A-stage matrix switch. The last-mentioned marking condition operative co-ordinately with marking (5) above, brings about operation of the required crosspoint relay of the defined A-stage switch to complete the four-stage through-connection. The additional contact of the particular A-stage crosspoint relay also completes a path to a device associated with the particular network inlet to permit each of the four relays appertaining to the through connection to be maintained in series, over a hold path, involving the additional contact of each of those relays. Holding potentials are provided from devices (e.g. relay sets) terminated upon the particular inlet and outlet of the switching network, so that the connection is independently maintained, when the marking means is released in readiness for use in the establishment of a subsequent connection.

A switching network of the general kind outlined above, which comprises a succession of marking-controlled stages of relay-type identically-oriented matrix switches with a marking diode for each crosspoint relay and which provides for sequential operation of crosspoint relays appertaining to a connection together with series holding of those relays, may hereinafter be referred to as a switching network of the kind defined.

Arising from the advent of high-speed digital computers considerable development has taken place in the use of data processors for the overall management of telecommunications switching centers or exchanges.

Switching networks of the multi-stage matrix-switch type alluded to above, being capable of setting-up connections at relatively high-speed, are eminently suitable for use in conjunction with data processors to constitute automatic telephone exchanges and the like.

It is already known in the case of stored-programme data-processors, in this environment, to incorporate therein a so-called "map" incorporating an array of storage elements, e.g. magnetic cores, which, in a sense, may be considered as being a replica of the or each switching network served by the data-processor or the data-processor complex. This map constitutes a record of the prevailing busy or idle states of the salient points (network inlets, outlets and links) of the or each switching network, of the exchange.

When as a result of information forthcoming to the data-processor, it is determined that a connection is required to be set-up between a particular network inlet and outlet, the map is interrogated in respect of all possible paths between those network terminations. Of these paths, those which are assessed as unavailable, due to "busy" indications provided by pertinent map storage elements, are discarded. However, in the normal course of events at least one path will be indicated as being available for use. This path, or one of them so indicated, is nominated by the processor; the map-storage elements relevant to the nominated path being duly up-dated to signify busy, and the processor is effective in extending data significant of the nominated path to the network marking means by way of suitable interface equipment. The transferred data is stored and the marking means is activated, in the case of a switching network of the kind hereinbefore described, to effect the setting-up of the required connection progressively from one end; the connection being maintained from potentials at each end when the marking means is duly released.

When the through-connection is eventually disconnected upon clearance of the parties involved, an appropriate signal derived from the appropriate network termination is extended to the data-processor to enable the latter to restore the relevant storage elements of the map to their idle-signifying states.

One problem remains in respect of the setting-up of connections, in that the path predicted or nominated for use as a result of the map interrogation and selection procedure, and communicated to the marking means as control data, may be at variance with the actual state of the path in the network itself, possibly due to a malfunction in or associated with the map area of the processor. Indeed if the disparity were due to a persistent defect in the up-dating procedure of the map the latter could be progressively corrupted with chaotic results in respect of the service offered by the exchange. However whether the disparity is due to a transient, intermittent or persistent defect it is desirable that the disparity should be detected and an indication of its nature presented so that such remedial action as may be necessary may be taken. Indeed the remedial action may be performed automatically by calling into use that portion of the processor which is concerned with recording, analysis and correction of faults.

It can be deduced that if, following a map interrogation and selection procedure, a defect in the data communicated to the marking means could result in the latter endeavoring to set-up a connection when a portion of the required path is already occupied by another connection through the network. Under these circumstances numerous possibilities arise for the malfunctioning of the network.

The incidence of certain faults in the switching network itself, or even in the marking means, in respect of any path which the marker has been instructed to set up may result in the failure of that path to be established. Again it is desirable that facilities should be provided to enable the maintenance officer to deduce the nature and location of the fault which impedes the setting-up of the required connection.

It is appreciated that the provision of such facilities may be useful in the location of wiring faults and defective components encountered within the switching network or marking means during the processing of systematic test calls prior to commissioning the exchange for service.

An object of the present invention is to provide a facility in a telecommunications exchange employing a switching network of the kind hereinbefore described whereby a condition of fault, such as those mentioned above and resulting in the failure of a connection to be established, produces a pertinent indication.

According to the invention there is provided a switching network and control means of the kind wherein the network comprises a succession of marking-controlled stages of identically-oriented relay-type matrix switches having a marking diode for each crosspoint thereof and an inlet marking conductor for corresponding inlets of all switches of each stage individually, and for each stage each inlet marking conductor extends over marking diodes to individual operate coils of the crosspoint relays of a corresponding inlet of each of the switches and wherein the establishment of any connection over the network as a result of said control means effecting the marking of the pertinent marking conductors of said stages is brought about by the sequential operation of a crosspoint relay in one switch of each stage, characterized in that the control means includes a separate detecting device for each stage of the network and each said detecting device is connected to all the inlet marking conductors of the pertinent stage and is responsive to a signal emanating over some of said marking diodes and produced solely by application of a significant source of potential to the marking conductor of the matrix switch outlet to which said inlet is required to be connected.

Also according to the invention a marking device is provided for each inlet marking conductor of a stage and one of said marking devices which is appropriate to a required inlet of a matrix switch and to corresponding inlet of other matrix switches of the same stage is arranged to be rendered operative by said control means as a result of the response of the detecting device of the stage.

According to a feature of the invention said control means include (a) a resettable timing device actuable to attain a state defining a maximum period for establishment of each connection through the network and arranged to be reset when such a connection is established within a said period and (b) a separate monitoring device for each stage of the network and which is connected to the marking devices of all inlets of the matrix switches of the relevant stage said monitoring devices being collectively controlled upon the said timing device attaining its said state to institute a signal indicative of each stage (if any) of the network at which the operation of an inlet marking device is evident.

According to another aspect of the invention there is provided a matrix switch employing marking diodes between its inlet marking leads and the crosspoint relay coils characterized in that the inlet marking leads are connected to a common detecting device and to individual marking devices, and a marking device appropriate to a required inlet of the switch is rendered operative as a result of actuation of the detecting device by signal emanating over some of the marking diodes solely due to application of a significant source of potential to the marking conductor of that outlet of the matrix switch to which said inlet is required to be connected.

The invention will be better understood from the following description of the preferred method of carrying it into effect which should be read in conjunction with the accompanying circuit drawing. The circuit, in abbreviated form for ease of understanding, shows portions of a typical four-stage switching network using matrix switches with relay/diode crosspoints and essential parts of the marking and fault detection arrangements associated with the switching network.

The switching network having the inlets and outlets sides designated IS and OS respectively is represented by one crosspoint relay (A, B, C and D) of one matrix switch of each stage. The crosspoint relays, being typically of the reed-contact type, have three "make" contact-units each, and the three inter-stage links appertaining to a network connection involving the four relays are referenced LKA-B, LKB-C and LKC-D.

Taking the typical crosspoint relay A, its contacts A2 and A3 are concerned with connecting the − and + speech wires of a particular network inlet (inlet or column of the particular matrix switch) directly to inter-stage link LKA-B. The common symbol to the left of the collectively represented contacts A2 and A3 signifies that the network inlet is selectively connectable by other A crosspoint relays of the same matrix column to other links such as LKA-B but terminating at inlets (columns) of different B matrix switches. The common symbol to the right of contacts A2 and A3 infers that link LKA-B, terminating on an outlet (row) is selectively connectable to any of those network inlets terminated on the inlets of the particular matrix switch. The common symbols to the left of the contacts A1 and to the right of the winding of relay A have significances corresponding to the symbols immediately above them and already referred to. The common symbol immediately below the marking diode DA (individual to crosspoint relay A) has a corresponding significance to those to the left of contacts A1 to A3 and infers that the common marking lead extending from contacts 4M is appropriate to all A crosspoint relays of the particular inlet (matrix column) of the matrix switch concerned; whereas the lower common symbol of said marking lead infers that the marking lead is similarly associated with other matrix switches of the same stage.

It can be deduced that somewhat similar considerations apply in respect of the common symbols associated with the remaining typical crosspoints of the network.

Let us assume initially that a path involving the four typical crosspoint relays has already been established over the network under control of marking means which has been released in readiness for setting-up a subsequent connection. Accordingly the contacts of all said relays would be operated (i.e. closed) as are contacts HR which together with diode DH and resistor RH are incorporated in a device, e.g. a relay set, to which the conductors of the particular outlet are connected.

Under these circumstances the connection is maintained, independently of the now released marking arrangements, by potentials HP1 and HP2 derived from network terminating device e.g. relay sets associated with the particular network inlet and outlet respectively. The four illustrated cross-point relays, A, B, C and D, are held in series over a hold path H including contacts A1, B1, C1 and D1, diode DH, contacts HR and resistor RH. Resulting from the ohmic values of the components involved in the series holding circuit and the values of the potentials HP1 and HP2, it may be taken that the potentials obtaining at points on the hold wire, namely at links LKA-B, LKB-C and LKC-D and the network outlet (i.e. the junction of relay D and diode DH) approximate to −9.5, −19, −28.5 and −38 volts respectively with regard to earth. Potentials such as these will be evident at corresponding points of all established connections of the switching network.

Reference will now be made to the procedure employed in the setting-up of a connection over the network and to the monitoring of that procedure which is a feature of the invention. It is to be noted that, in connection with monitoring facility, the circuit includes four voltageolevel detectors DETA, DETB, DETC and DETD, one for each stage of the network and each is connected, by way of isolating diodes such as DS, DR, DQ or DP respectively, to all the common marking wires (matrix switch inlets) of the pertinent stage of the switching network; the marking wires being typified by those associated with marking contacts 4M, 3M, 2M and 1M.

It can be assumed that the overall management of the switching center or exchange, including that of the particular switching network, is controlled by a stored-programme data processor involving "map" interrogation and connection-nomination functions, and accordingly data relevant to a unique path to be set-up is extended from the processor, and over the path IE from interface equipment, to the data storage and marking control apparatus SMC.

An initial effect of the reception of connection or path data by apparatus SMC is that it selectively operates one of 64 relays such as HM and one of four switching devices (preferably electronic) such as PZ; the relays having four "make" contacts each whereas the devices PZ are the equivalent of a relay with a single "make" contact each. It may be taken that the various contacts such as HMC and the devices such as PZ form an array served by a high-value resistor RT and enable the voltage source V (−100v) derived over a said resistor to be selectively extended (according to path data received by apparatus SMC) to the hold conductor of any required network outlet.

The particular array of contacts HMC and switching devices PZ allows for a network outlet capacity of 256, and it may be mentioned that a network of this outlet capacity is likely to form part of a considerably larger complex network for the whole exchange. The outlined mode of connection of the high-resistance −100v condition, which may be referred to as a "test-marking", is by way of example only, since other methods can be used and variations introduced according to the outlet capacity of the network concerned.

It may be mentioned that at this juncture contacts HR of a relay (not shown) of a relay set associated with the nominated network outlet are closed, but the associated diode DH is backed-off by the applied potentials.

At or about the time when apparatus SMC institutes the "test-marking" condition, it also applies a start signal over lead ST to the pre-set timer T which has a maturation period of the order of 25 milli-secs., which is slightly greater than the period normally required to set-up any network through-connection. It is to be noted that the timer will only be permitted to produce its delayed output if the particular nominated network-connection is not set-up within the period being measured.

In the absence of any impediment, detector DETD is activated by the test-marking emanating from −100v over high value resistor RT; the test-marking extending over a multiplicity of paths typified by relay D and its marking diode DD, to the detector via isolating diodes such as DP. The paths involved are those appropriate coils of those crosspoint relays relevant to the defined matrix-switch outlet (row). No crosspoint relay can be operated at this juncture but activation of the detector causes a signal to be extended to the data storage and marking control apparatus SMC whereby the latter brings about operation of one of a group of four switching devices such as Z; the particular device being that which corresponds to the operated device PZ. The operated device Z, now effectively shunts the high-resistance test-marking (resistor RT) by a low-resistance (resistor RM) condition. Thus −100v via resistor RM is applied, as a marking condition proper, to one side of all the D crosspoint relays appertaining to the required outlet of the particular matrix, preparatory to operation of one of those relays. Also at this juncture, and as a further result of the signal received from detector DETD, apparatus SMC effects closure of the particular marking contacts 1M in accordance with pertinent connection information presently stored. Therefore the marking voltage source V1 (−70v) is applied, over diodes such as DD, to the crosspoint relays of the matrix inlet (column) appropriate to the nominated link LKC-D; the marking potential being likewise applied to other matrix switches of the particular stage of the switching network but ineffectually.

The co-ordinate marking of the appropriate D-stage matrix switch brings about operation of the D crosspoint relay, which at contacts D2 and D3 connects the − and + leads of the outlet to link LKC-D. Relay D, at contacts D1, moreover extends a marking/testing potential (substantially −70v) to the hold wire of link LKC-D whence it is advanced, over a multiplicity of branch paths involving C crosspoint relay coils and associated marking diodes DC, to detector DETC via isolating diodes DQ; the crosspoint relays involved being those appropriate to the pertinent matrix-switch outlet (row). The conditions are such that none of said C crosspoint relays are caused to operate.

However, in the absence of any impediment detector DETC responds to the marking/testing potential forthcoming over contacts D1 and extends a significant signal to apparatus SMC. The latter thereupon operates marking contacts 2M in accordance with connection data evident in store. Consequently the marking voltage source V2 (−58v) is applied, by way of diodes such as DC, to the left-hand side of the column of C crosspoint relays appropriate to the required inlet of the C-stage matrix switch relevant to the required connection; the same marking condition being ineffectually applied to a corresponding column of crosspoint relays of the other switches of the stage. The completed co-ordinate marking of the required C-crosspoint relay normally effects operation of that relay so that contacts C2 and C3 further extend the − and + wires of the network outlet to link LKB-C. Furthermore contacts C1 connect a marking/testing potential (substantially −58v) to hold wire of link LKB-C from which it is extended over a multiplicity of branch paths involving B crosspoint relay coils and associated marking diodes DB to detector DETB, via appropriate isolating diodes DR.

Therefore detector DETB, of the B-stage of the network, is operative in the absence of any impediment, and the resultant signal applied to apparatus SMC causes the latter to actuate the particular marking contacts 3M as defined by the relevant part of the stored path-data. Thus contacts 3M complete the co-ordinate marking of the requisite B crosspoint relay.

Upon operation of that B crosspoint relay, the network outlet is extended to link LKA-B, and contacts B1 apply, via the hold wire of said link, an outlet marking potential (substantially −46v) to the pertinent A stage matrix whence it is extended, initially for testing purposes over the multiplicity of branch paths involving A crosspoint relay coils and marking diodes such as DA to detector DETA, via appropriate isolating diodes DS. The A-stage detector DETA thereupon responds, in the absence of any impediment, and its significant output signal causes apparatus SMC to close contacts 4M, again in accordance with stored connection-information. Contacts 4M extend the final marking-potential source V4 (−33v), by way of diodes such as DA, to complete the co-ordinate marking of a defined crosspoint relay in the relevant A-stage matrix. The A crosspoint relay therefore operates in the normal course of events and the through-connection between network inlet and outlet is completed by contacts A1 to A3.

Upon the closure of contacts A1, the hold potential source HP1 is so effective in changing the electrical state of the hold wire of line LKA-B that detector DETA is conditioned to apply a so-called "1" signal to one input lead of the 2-input AND gate GSC. The second input lead of this gate is already in receipt of a "1" signal from the registration device FMR as a result of the final marking (−33v) having been applied to the network. Accordingly the gate produces a "1" output at lead R, and this signal initiates the resetting of apparatus SMC and attendant devices which were concerned in the setting-up of the through-connection. Thus all markings are duly removed from the network and the equipment is made available for use in the setting-up of any subsequent connection. Very importantly, the initiation of resetting of apparatus SMC inhibits and resets the timer T so that it has no influence upon gates GA, GB, GC and GD. Also apparatus SMC during its releasing function passes a signal back to the data processing equipment to cause the latter to update its map in accordance with the now busy salient points of the present through-connection.

The connection through the network is now maintained by series holding of the crosspoint relays from potentials HP1 and HP2; diode DH being permitted to conduct by the removal of the −100v marking upon release of the marking means.

From all the foregoing description of the setting-up procedure of a typical connection through the network, by the successive operation of appropriate D, C, B and A crosspoint relays, it is evident that the continuity of the procedure is dependent upon the actuation of the voltage-level detectors DETD, DETC, DETB and DETA at the appropriate times. Thus failure of detector DETD, DETC, DETB or DETA to actuate would result in failure to effect co-ordinate marking of the required crosspoint relay D, C, B or A respectively.

Now the depicted network outlet is accessible from all the links such as LKC-D of the particular D-stage matrix switch. It is therefore conceivable that, when the particular one of the multitudinous paths between the typical inlet and outlet of the network is nominated for use in accordance with the path information extended to apparatus SMC by the data processing equipment, this information may be erroneous in that the outlet now nominated for use is already occupied by an already established network connection. As already mentioned this could arise from the fact that the processing equipment map is at variance with the actual state of the network, i.e. the map signifies that the outlet is idle when it is actually busy.

It has already been demonstrated that, in respect of any established connection through the network, a potential of approximately −38 volts is present at the H wire of the outlet. If the typical outlet had been so conditioned when a newly nominated path is required to be set up in the manner described, the test-marking condition (−100v via high-value resistor RT) is rendered ineffective and the detector DETA is not actuated. Consequently relay D is not operated, and the setting-up procedure is discontinued.

Inter-stage links of which LKC-D, LKB-C and LKA-B are typical, are available when idle for possible use in the composition of numerous paths through the switching network; this being inferred by common symbols associated with the link wires shown. As already mentioned if the typical link LKC-D is occupied in any established connection, a potential of approximately −28.5 volts will be evident on the link hold wire. Correspondingly, if link LKB-C or LKA-B is occupied approximately −19 or −9.5 volts respectively will be evident on the hold wire of the appropriate link. Now reverting to the assumption that the path involving the typical crosspoint relays has been nominated for setting-up and that, due to the outlet being encountered idle, the detector DETD has been actuated to bring about operation of crosspoint relay D. The continuation of the normal setting-up procedure is then dependent upon the response of detector DETC to a potential (substantially −70 volts) advanced by contacts D1. However if link LKC-D is already in use on an existing network connection the −28.5 volts condition already present on the link H wire prevents the anticipated response of detector DETC. Consequently the operation of contacts 2M is prevented so that the co-ordinate marking and operation of relay C does not take place and again the setting-up procedure is discontinued.

A corresponding situation will obtain if the setting-up procedure has reached a point where, due to the satisfactory states of the network outlet and the particular link LKC-D crosspoint relays D and C have been operated but the required link LKB-C is already in use on another connection as evidenced by the presence of a potential of approximately −19 volts on the H wire of the link. This potential prevents the anticipated response of detector DETB when contacts C1 close, so that contacts 3M remain un-operated, co-ordinate marking and operation of crosspoint relay B is prevented and the setting-up procedure remains incomplete.

Again, in the absence of all the before-mentioned impediments, if the setting-up procedure, reaches a point where crosspoint relays D, C and B have been operated, but the nominated link LKA-B is already occupied, (−9.5v at H wire) then detector DETA is not actuated, so that contacts 4M fail to close and the connection is left incomplete by the non-operation of crosspoint relay A.

It follows from the foregoing that a stoppage in the setting-up procedure of any connection due to:

a. The required network outlet being encountered busy is denoted by none of the marking contact units such as 1M, 2M, 3M and 4M being operated.
b. the required link LKC-D being encountered busy is denoted by one of contact units such as 1M being operated but none of contact units such as 2M, 3M and 4M being operated,
c. the required link LKB-C being encountered busy is denoted by one of each contact units such as 1M and 2M being operated, but none of contact units such as 3M and 4M being operated, or
d. the required link LKA-B being encountered busy is denoted by one each of contact units such as 1M, 2M and 3M being operated, but none of contact units such as 4M being operated.

The circuit arrangements incorporate four 2-input AND gates GA, GB, GC and GD, a first input lead of each of which is served by the output of the pre-set timer T. The second input leads of gates GA, GB, GC and GD are individually associated, by way of an appropriate one of the electronic buffer devices BA, BB, BC and BD with all the marking contacts such as 4M, 3M, 2M and 1M respectively; diodes such as DZ, DY, DX and DW being included for isolation purposes. The nature of each buffer device is such that the pertinent gate is prepared for actuation at its second input lead, only when a relevant marking contact unit is effectively closed.

In all the examples, given above, of failure in the completion of a nominated network connection, the timer T is not inhibited, and in due course it applies a signal to lead SF of apparatus SMC to indicate that set-up has not been completed. Moreover each, if any, of those gates GA, GB, GC and GD which has been prepared, as aforesaid by operation of a relevant marking contact unit, is now activated and produces a so-called "1" signal at the relevant one of leads FA, FB, FC and FD extending to apparatus SMC; the remaining lead(s) remaining at the "O" state.

It can be deduced that under the four conditions of fault (a), (b), (c) and (d) listed above, a 4-bit code 0000, 0001, 0011 and 0111 respectively is presented to apparatus SMC; in each case the bits reading from left to right are appropriate to leads FA, FB, FC and FD respectively. A further signal code, namely 1111 is available in respect of another fault condition to be referred to later.

As a result of the signal applied to lead SF under any of the fault conditions mentioned, apparatus SMC is prevented from up-dating the processor map in accordance with data appertaining to the failed connection. However that portion of the processor which is concerned with fault recording and analysis would be called into service and the information indicative of the point of stoppage of the setting up procedure is communicated to it, together with the identity of the network, for use in conjunction with the relevant connection data, possibly to effect automatic correction of the state of the map. The marking and control arrangements locally associated with the network are duly released so as to be available for setting-up a subsequently required connection.

Although a switching network and its related setting-up control equipment may be designed to give a high-standard of operational reliability there is always the possibility that failure to complete a connection procedure may arise from a fault within the network itself or from the locally associated control equipment. It can be deduced that such failures will be detected and the indications processed in the manner outlined. The relevance of the before-mentioned 4-bit signal codes to typical network and local control faults are tabled below:

a. 0000
   i. initial test-marking not accomplished due to failure of contacts HMC or device PZ,
   ii. contacts 1M fail to close effectively,
b. 0001
   i. relay D fails to operate due to disconnection of coil or marking diode, or failure of device Z,
   ii. contacts D1 or 2M fail to close effectively,
   iii. link LKC-D hold wire disconnected,
c. 0011
   i. relay C fails to operate, due to disconnection of coil or marking diode,
   ii. contacts C1 or 3M fail to close effectively,
   iii. link LKB-C hold wire disconnected,
d. 0111
   i. relay B fails to operate due to disconnection of coil or hold wire
   ii. contacts B1 or 4M fail to close effectively,
   iii. link LKA-B hold wire disconnected.

The presentation of the fifth possible signal code namely 1111 would signify that, although the outlet and the links have been encountered idle, a condition of fault is evident in relation to the A-stage of the network and has prevented generation of a "1" signal by gate GSC and the consequent re-setting of timer T. The situation would arise due to (i) the failure of crosspoint relay A to operate because of its coil or diode being disconnected or (ii) the failure of contacts A1 to advance the holding potential source HP1 so that detector DETA does not apply a "1" signal to gate GSC.

The arrangements described for monitoring the setting-up of connections over the network may well be used to assist exchange installation personnel in the detection of faults in the switching network and its local control equipment prior to the data processing equipment being brought into use. Accordingly information relevant to test calls may be applied systematically to apparatus SMC, so that connections which fail to be completed will produce code signals at leads FA to FD. Detecting devices meantime connected to those leads or to other suitable points of apparatus SMC would then indicate the point of stoppage of the setting-up procedure to enable a detailed investigation of the relevant area to be made for the purpose of exactly locating the fault.

What we claim is:

1. A switching network and control means of the kind wherein the network comprises a succession of marking-controlled stages of identically-oriented relay-type matrix switches having a marking diode for each crosspoint thereof and an inlet marking conductor for corresponding inlets of all switches of each stage individually, and for each stage each inlet marking conductor extends over marking diodes to individual operate coils of the crosspoint relays of a corresponding inlet of each of the switches and wherein the establishment of any connection over the network as a result of said control means effecting the marking of the pertinent marking conductors of said stages is brought about by the sequential operation of a crosspoint relay in one switch of each stage, characterized in that the control means includes a separate detecting device for each stage of the network and each said detecting device is connected to all the inlet marking conductors of the pertinent stage and is responsive to a signal emanating over some of said marking diodes and produced solely by application of a source of outlet-marking potential to the marking conductor of the matrix switch outlet to which said inlet is required to be connected and said control means also includes for each stage a separate marking device for each inlet marking conductor of the stage, one of said marking devices being rendered operative by said control means as a result of the response of the detecting device of the stage.

2. A switching network with control means as claimed in claim 1 and in which said control means includes (a) a resettable timing device actuable to attain a state defining a maximum period for establishment of each connection through the network and arranged to be reset when such a connection is established within a said period and (b) a separate monitoring device for each stage of the network and which is connected to the marking devices of all inlets of the matrix switches of the relevant stage, said monitoring devices being collectively controlled upon the said timing device attaining its said state to institute a signal indicative of each stage (if any) of the network at which the operation of an inlet marking device is evident.

3. A matrix switch employing marking diodes between its inlet marking leads and the crosspoint relay coils characterized in that the inlet-marking leads are connected to individual inlet-marking devices and over isolating diodes to a common detecting device, and the inlet-marking device of an inlet of the switch is rendered operative to apply an inlet-marking potential to the related inlet-marking lead as a result of actuation of the detecting device by a signal emanating over some of the marking diodes solely due to application of a source of outlet-marking potential to the marking conductor of that outlet of the matrix switch to which said inlet is required to be connected.

* * * * *